(12) United States Patent
Mitts et al.

(10) Patent No.: US 9,599,178 B2
(45) Date of Patent: Mar. 21, 2017

(54) BRAKE CAMSHAFT AND METHOD OF MANUFACTURE

(71) Applicant: ArvinMeritor Technology, LLC, Troy, MI (US)

(72) Inventors: Chad Mitts, Canton, MI (US); Marcel Rusz, Farmington Hills, MI (US); Matthew J. McGinn, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 517 days.

(21) Appl. No.: 13/912,380

(22) Filed: Jun. 7, 2013

(65) Prior Publication Data

US 2014/0360828 A1   Dec. 11, 2014

(51) Int. Cl.
| | | |
|---|---|---|
| *F16D 51/00* | (2006.01) | |
| *F16D 65/22* | (2006.01) | |
| F16D 125/30 | (2012.01) | |
| F16D 125/56 | (2012.01) | |

(52) U.S. Cl.
CPC .......... *F16D 65/22* (2013.01); *F16D 2125/30* (2013.01); *F16D 2125/56* (2013.01); *Y10T 29/49826* (2015.01); *Y10T 29/49945* (2015.01)

(58) Field of Classification Search
CPC ............. F16D 2125/28; F16D 2125/30; F16D 2125/32; F16D 51/12; F16D 51/22; F16D 51/28; F16D 65/22
USPC ........................................ 188/329, 330, 332
See application file for complete search history.

(56) References Cited

U.S. PATENT DOCUMENTS

| | | | | |
|---|---|---|---|---|
| 1,875,759 A | * | 9/1932 | Calvignac | B60T 11/043 188/194 |
| 2,892,662 A | * | 6/1959 | Scheel | F16C 33/20 188/205 R |
| 3,204,482 A | * | 9/1965 | Behnke | F16D 65/22 228/176 |
| 4,200,174 A | * | 4/1980 | Borugian | F16D 51/22 188/250 C |
| 4,838,389 A | * | 6/1989 | Mamery | F16D 65/22 188/205 R |
| 6,612,390 B2 | | 9/2003 | Bennett et al. | |
| 2003/0024778 A1 | * | 2/2003 | Baldwin | F16D 51/00 188/78 |
| 2009/0107786 A1 | * | 4/2009 | Eveley | B60T 17/088 188/325 |

(Continued)

FOREIGN PATENT DOCUMENTS

| | | |
|---|---|---|
| CN | 201851555 U | 6/2011 |
| CN | 202833930 U | 3/2013 |

(Continued)

OTHER PUBLICATIONS

Machine translation of DE 1144607 (no date).*

(Continued)

*Primary Examiner* — Nicholas J Lane
(74) *Attorney, Agent, or Firm* — Brooks Kushman P.C.

(57) ABSTRACT

A brake camshaft and a method of manufacture. The brake camshaft may include a tube portion, a cam portion, and an end portion. The tube portion may have a first tube end, a second tube end, and a tube cavity that extends from the first tube end to the second tube end. The cam portion may be disposed on the first tube end. The end portion may be disposed on the second tube end.

15 Claims, 6 Drawing Sheets

(56) References Cited

U.S. PATENT DOCUMENTS

2013/0112036 A1* 5/2013 Miller .................... F16D 65/22
74/567

FOREIGN PATENT DOCUMENTS

DE           1144607 B   *   2/1963  ............. F16D 65/22
GB     EP 0408254 A1 *   1/1991  ............. F16D 65/22

OTHER PUBLICATIONS

Chinese Patent and Trademark Office, Office Action for the corresponding Chinese Patent Application No. 201410074587.0 dated Mar. 4, 2016.

\* cited by examiner

BRAKE CAMSHAFT AND METHOD OF MANUFACTURE

TECHNICAL FIELD

This application relates to a brake camshaft and a method of manufacture.

BACKGROUND

A brake camshaft is disclosed in U.S. Pat. No. 6,612,390.

SUMMARY

In at least one embodiment, a brake camshaft is provided. The brake camshaft may include a tube portion, a cam portion, and an end portion. The tube portion may have a first tube end, a second tube end, and a tube cavity that extends from the first tube end to the second tube end. The cam portion may be disposed on the first tube end and may be configured to actuate a brake pad assembly. The end portion may be disposed on the second tube end.

In at least one embodiment, a brake camshaft is provided. The brake camshaft may include a tube portion, a cam portion, and an end portion. The tube portion may extend along an axis any may have a first tube end, a second tube end disposed opposite the first tube end, and a tube cavity that extends from the first tube end to the second tube end. The cam portion may be fixedly disposed on the first tube end and may be configured to actuate a brake pad assembly. The end portion may be fixedly disposed on the second tube end. The end portion may have an end portion cavity that may extend through the end portion to the tube cavity.

In at least one embodiment, a method of making a brake camshaft is provided. The method may include providing a tube that may have a tube cavity that may extend from a first tube end to a second tube end. A cam portion may be fixedly coupled to the first tube end. The cam portion may be configured to actuate a brake pad assembly. An end portion may be fixedly coupled to the second tube end.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
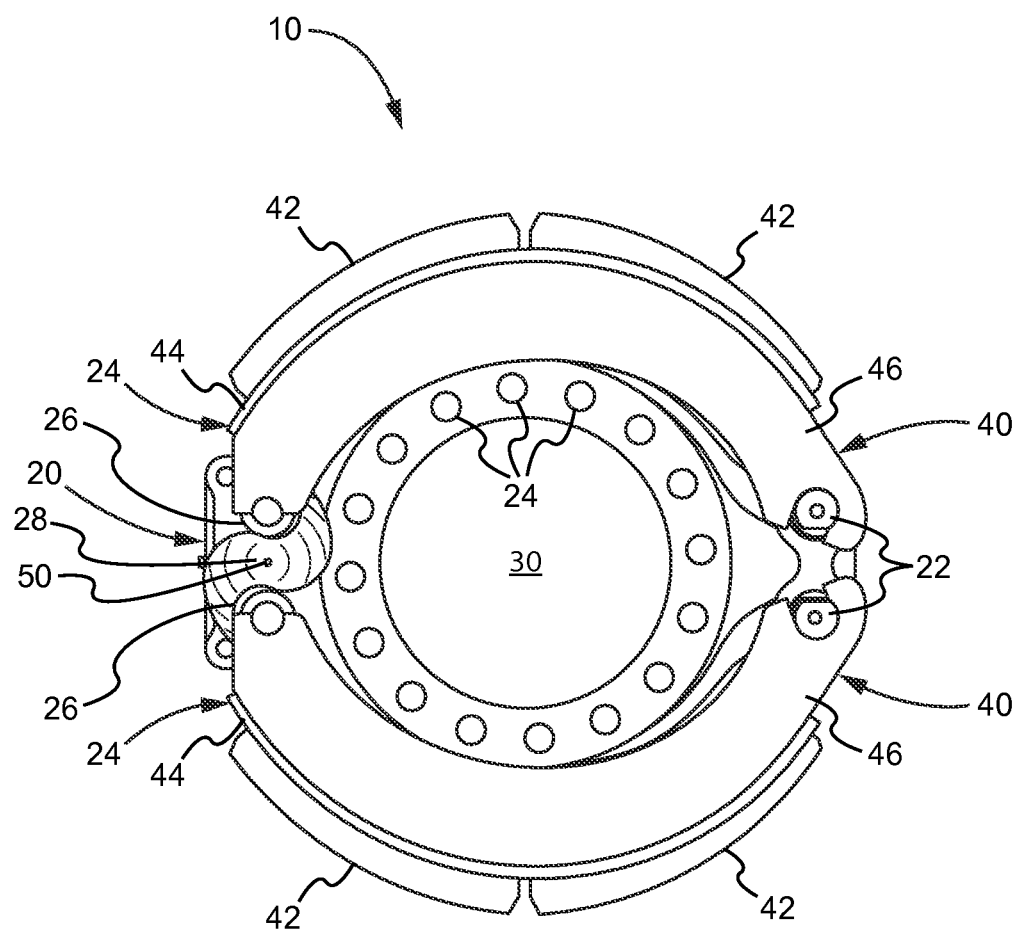
FIG. 1 is a side view of a brake assembly having a camshaft.

Referring to FIG. 1, an exemplary brake assembly 10 is shown. The brake assembly 10 may be provided with a vehicle, such as a motor vehicle like a truck, bus, farm equipment, military transport or weaponry vehicle, or cargo loading equipment for land, air, or marine vessels. In addition, the brake assembly 10 may be provided on a trailer that may be coupled to or provided with a motor vehicle.

The brake assembly 10 may be configured as a friction brake that may slow or inhibit rotation of at least one associated wheel assembly. In FIG. 1, the brake assembly 10 has a drum brake configuration. In a drum brake configuration, a brake drum may extend continuously around brake shoe assemblies that may be configured to engage the brake drum to slow rotation of an associated wheel assembly. The brake drum may be disposed between a wheel assembly that may have a wheel and a tire and a wheel hub assembly that may rotatably support the wheel assembly. In at least one embodiment, the brake assembly 10 may include a spider 20, at least one anchor pin 22, at least one brake shoe assembly 24, a cam roller 26, and a camshaft 28.

The spider 20 may support various components of the brake assembly 10. In addition, the spider 20 may facilitate mounting of the brake assembly 10 to the vehicle. For example, the spider 20 may be fixedly disposed on or with respect to an axle assembly or steering knuckle. In at least one embodiment, the spider 20 may include an opening 30 through which an axle and/or a spindle may extend. For example, a spindle may extend through the opening 30 and may support one or more wheel bearings that support and facilitate rotation of a wheel assembly. A plurality of spider mounting holes 32 may be arranged around the opening 30. Each spider mounting hole 32 may receive a fastener, such as a bolt, that may extend through the spider mounting hole 32 for coupling the spider 20 to an axle assembly or steering knuckle.

Figure 2:
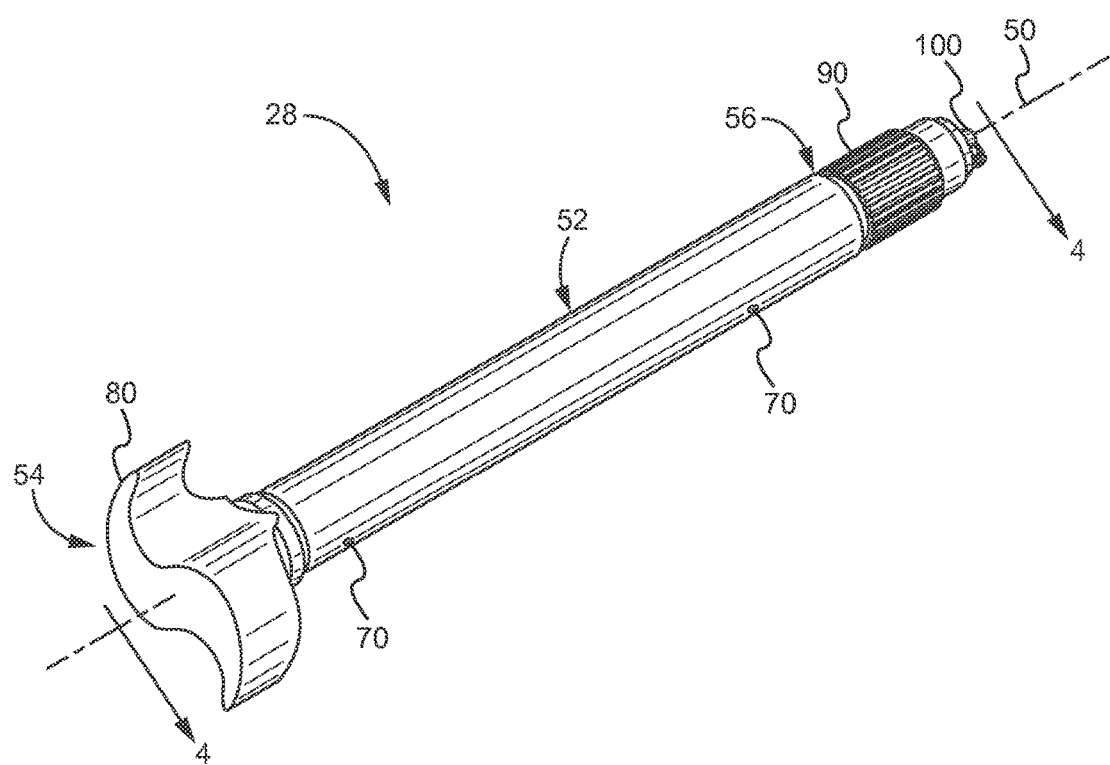
FIG. 2 is a perspective view of an exemplary camshaft.

The spider 20 may also have an anchor pin hole that may receive an anchor pin 22 that facilitates mounting of a brake shoe assembly 24. In FIG. 2, two anchor pins 22 are shown that are disposed on the spider 20 and located across the opening 30 from the camshaft 28. Each anchor pin hole may receive a different anchor pin 22, which in turn may support a corresponding brake shoe assembly 24. Alternatively, the anchor pin 22 may be integrally formed with the spider 20 in one or more embodiments. Each anchor pin 22 may be fixedly positioned on or with respect to the spider 20.

The spider 20 may also have a camshaft opening that may receive the camshaft 28. More specifically, the camshaft 28 may extend through the camshaft opening and may be configured to actuate a cam roller 26 that may support a corresponding brake shoe assembly 24 as will be discussed in more detail below.

The brake shoe assembly 24 may be configured to slow or inhibit the rotation of a wheel or wheel end assembly. In FIG. 1, two brake shoe assemblies 24 are shown in an installed position in which the brake shoe assembly 24 is coupled to the spider 20 via an anchor pin 22 and a cam roller 26. The brake shoe assembly 24 may include a brake shoe 40 and a friction material 42.

The brake shoe 40 may be a structural member of a brake shoe assembly 24 and may facilitate mounting of the brake shoe assembly 24 to the spider 20. The brake shoe 40 may include a table 44 and at least one web 46. The table 44 may be configured to support the friction material 42 and may be curved or extend along an arc that may have a substantially constant radius. One or more webs 46 may extend from the table 44. For example, a web 46 may extend from and may be disposed substantially perpendicular from a surface of the table disposed opposite the friction material 42 in one or more embodiments. The web 46 may have a first end that may have an anchor pin slot that may receive the anchor pin 22 and a second end that may be disposed opposite the first end and that may have a cam roller slot that may receive the cam roller 26.

The friction material 42, which may also be called a brake lining, may be disposed on the brake shoe 40 and may face toward the brake drum. The friction material 42 may engage the brake drum during vehicle braking and may be spaced apart from the brake drum when the friction braking is not being applied.

The cam roller 26 may facilitate movement of a brake shoe assembly 24. In FIG. 1, a cam roller 26 is associated with each brake shoe assembly 24. The cam roller 26 may be rotatably disposed in the cam roller slot of a web 46 and may be disposed between the brake shoe 40 and the camshaft 28 when a brake shoe assembly 24 is in the installed position.

Figure 3:
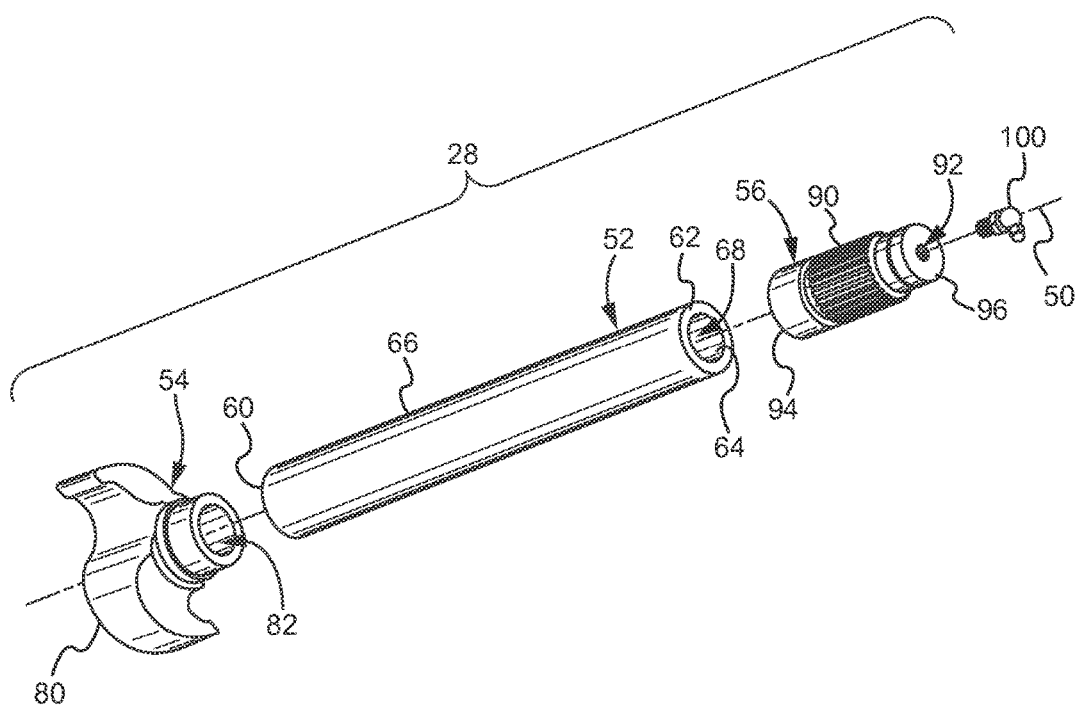
FIG. 3 is an exploded view of the camshaft of FIG. 2.
Figure 4:
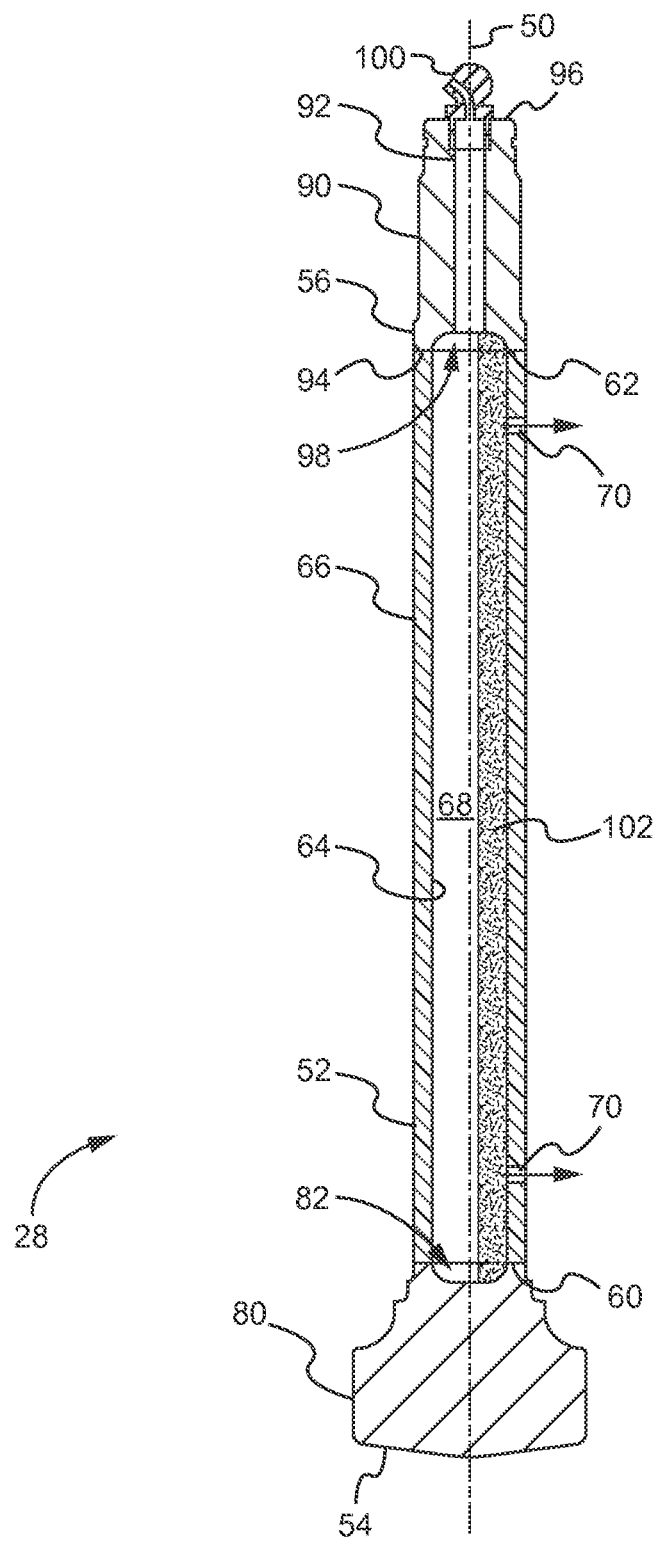
FIG. 4 is a section view of the camshaft shown in FIG. 2 along section line 4-4.
Figure 5:
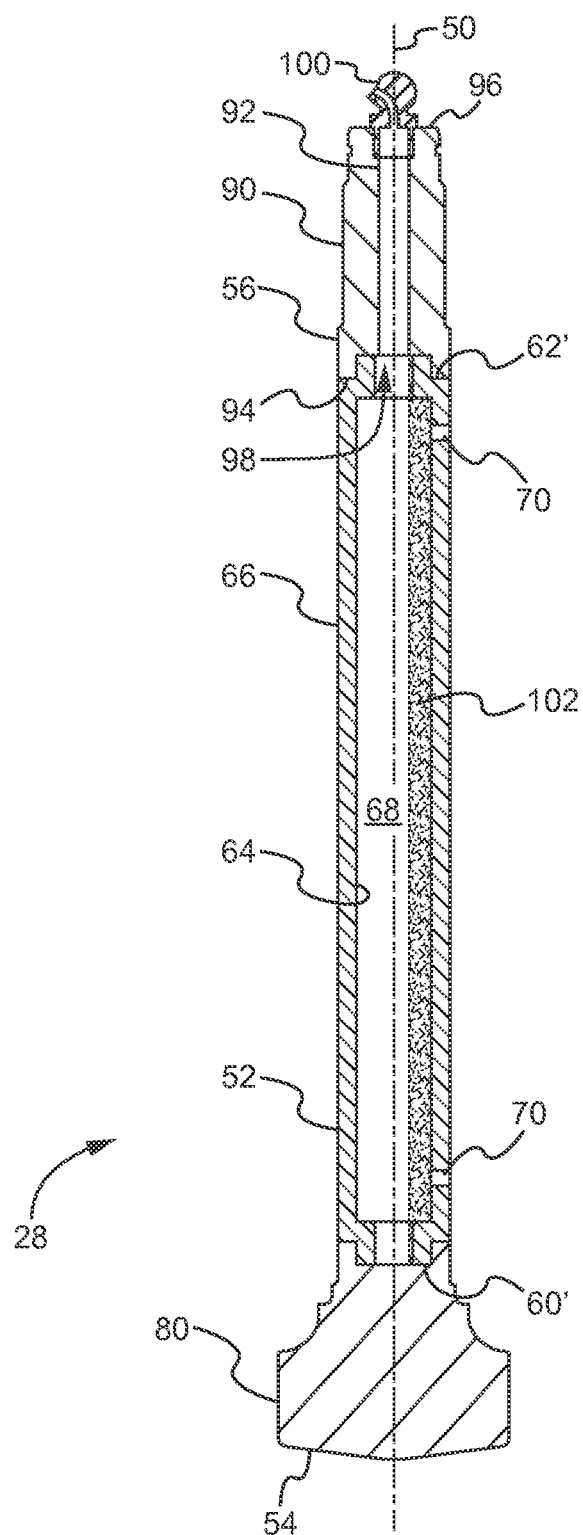
FIGS. 5 and 6 are section views of additional camshaft configurations.

Referring to FIGS. 2-4, a camshaft 28 is shown in more detail. In FIGS. 3-5 the camshaft 28 is rotated 90° from the installed position shown in FIG. 1 to accommodate paper size. The camshaft 28 may be configured to actuate the brake shoe assemblies 24. The camshaft 28 may extend along and may rotate about a camshaft axis 50. In addition, the camshaft 28 may extend through the camshaft opening in the spider 20. In at least one embodiment, the camshaft 28 may include a tube portion 52, cam portion 54, and an end portion 56.

The tube portion 52 may support the cam portion 54 and the end portion 56. The tube portion 52 may extend along the axis 50 and may have a hollow tubular configuration. In at least one embodiment, the tube portion 52 may have a first tube end 60, a second tube end 62, an inner surface 64, an outer surface 66, a tube cavity 68, and one or more outlet holes 70.

Figure 6:
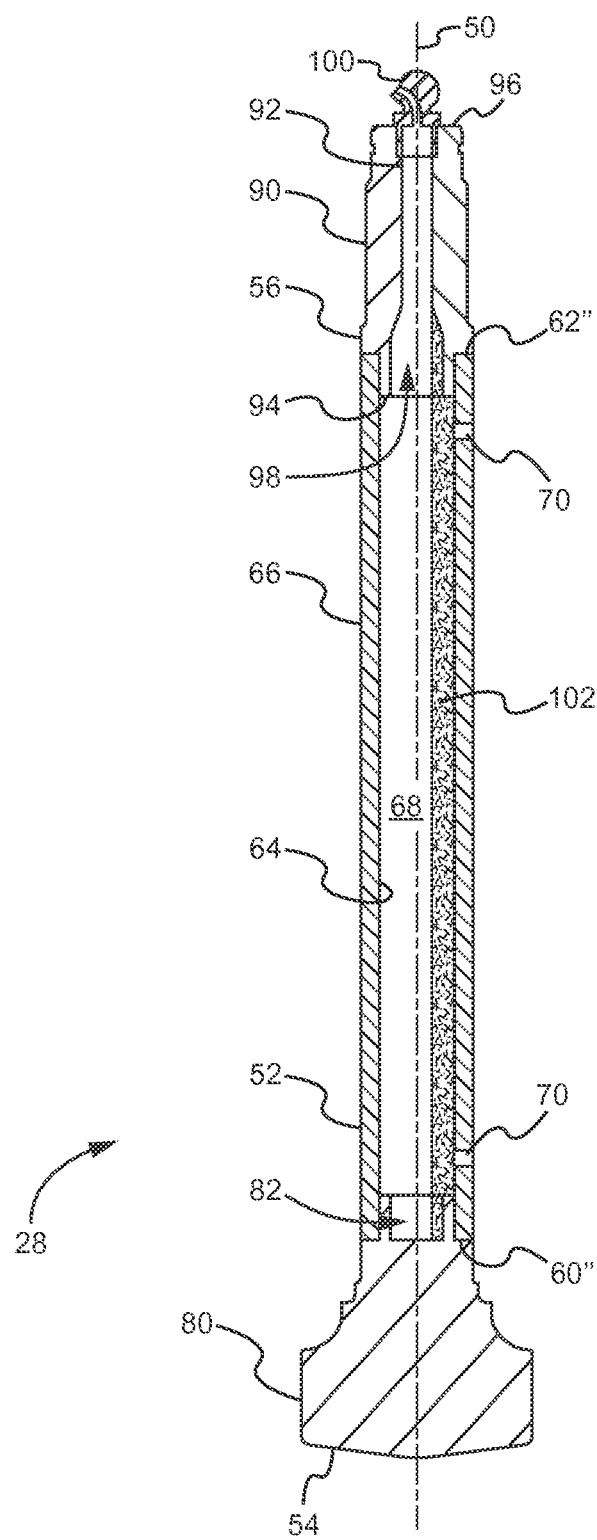

The first tube end 60 may be disposed adjacent to and may engage the cam portion 54. The first tube end 60 may be provided in various configurations. For example, the first tube end 60 may have a male configuration, a female configuration, or a neutral configuration that is neither male nor female. In FIG. 4, the first tube end 60 has a neutral configuration in which the first tube end 60 abuts the cam portion 54, but does not receive the cam portion 54 and is not received in the cam portion 54. Such a configuration may be employed when the cam portion 54 is friction welded to the tube portion 52. In FIG. 5, a first tube end 60' having a male configuration is shown in which the first tube end 60' of the tube portion 52 is received in the cam portion 54. In FIG. 6, a first tube end 60" having a female configuration is shown in which the first tube end 60" and tube cavity 68 receive the cam portion 54 such that the cam portion 54 is disposed inside the first tube end 60". In a male or female configuration, the first tube end 60', 60" may have one or more mating features, such as a spline or key, that may mate with one or more corresponding splines, keys or grooves on the cam portion 54.

The second tube end 62 may be disposed adjacent to and may engage the end portion 56. The second tube end 62 may be disposed opposite the first tube end 60. Like the first tube end 60, the second tube end 62 may be provided in various configurations. For example, the second tube end 62 may have a male configuration, a female configuration, or a neutral configuration. In FIG. 4, the second tube end 62 has a neutral configuration in which the second tube end 62 abuts the end portion 56, but does not receive the end portion 56 and is not received in the end portion 56. Such a configuration may be employed when the end portion 56 is friction welded to the tube portion 52. In FIG. 5, a second tube end 62' having a male configuration is shown in which the second tube end 62' of the tube portion 52 is received in the end portion 56. In FIG. 6, a second tube end 62" having a female configuration is shown in which the second tube end 62" and tube cavity 68 receive the end portion 56 such that the end portion 56 is disposed inside the second tube end 62". In a male or female configuration, the second tube end 62', 62" may have one or more mating features, such as a spline or key, that may mate with one or more corresponding splines, keys or grooves on the end portion 56.

It is contemplated that the first and second tube ends may be provided in various combinations of male, female, and/or neutral configurations. For example, the first tube end may have a male configuration while the second tube end may have a male, female, or neutral configuration; the first tube end may have a female configuration while the second tube end may have a male, female, or neutral configuration; or the first tube end may have a neutral configuration while the second tube end may have a male, female, or neutral configuration.

The inner and outer surfaces 64, 66 may extend from the first tube end 60 to or toward the second tube end 62. The inner and outer surfaces 64, 66 may be spaced apart from each other. In addition, the inner and outer surfaces 64, 66 may be radially disposed about the axis 50, thereby providing a tube portion 52 having a cylindrical configuration. Alternatively, the inner and/or outer surfaces 64, 66 may not have a cylindrical configuration or may not be radially disposed about the axis 50 in one or more embodiments.

The tube cavity 68 may extend from the first tube end 60 to the second tube end 62 and may be at least partially defined by the inner surface 64. The tube cavity 68 may reduce weight of the tube portion 52 and camshaft 28 as compared to a camshaft 28 having a solid configuration. In addition, the tube cavity 68 may receive, store and distribute lubricant to one or more bearings or bearing surfaces that may be provided with or disposed proximate the camshaft 28.

One or more outlet holes 70 may be provided with the tube portion 52. In FIG. 4, two outlet holes 70 are shown, but a greater or lesser number may be provided in various embodiments. The outlet hole 70 may extend from the inner surface 64 to the outer surface 66 and may be spaced apart from the first and second tube ends 60, 62. In addition, the outlet hole 70 may extend radially with respect to the axis 50 in one or more embodiments. The outlet hole 70 may allow lubricant to pass from the tube cavity 68 and exit the camshaft 28 proximate the outer surface 66 and flow to one or more bearings or bearing surfaces that may be provided with or disposed proximate the camshaft 28. In addition, the outlet holes 70 may allow gas to escape from the tube cavity 68 during attachment of the cam portion 54 and/or end portion 56 as will be discussed in more detail below.

The cam portion 54 may be disposed proximate the first tube end 60. The cam portion 54 may include a cam 80, such as an S-cam, that may be configured to engage the cam rollers 26. More specifically, rotation of the camshaft 28 about the axis 50 in a first direction may cause the cam 80 to actuate cam rollers 26 and the brake shoe assemblies 24 outwardly such that the friction material 42 moves toward or engages an inner surface of the brake drum to brake or slow or inhibit rotation of an associated wheel or wheel end assembly. Rotation of the camshaft 28 about the axis 50 in a second direction may allow the cam rollers 26 and brake shoe assemblies 24 to retract and disengage the inner surface of the brake drum. The cam portion 54 may include a cam cavity 82 that may extend from the tube portion 52 at least partially toward the cam 80 to effectively extend the length or volume of the tube cavity 68 and further reduce weight of the camshaft 28. The cam cavity 82 may receive a first tube end 60' having a male configuration as is shown in FIG. 5. The cam portion 54 may be a forging in one or more embodiments.

The end portion 56 may be disposed proximate the second tube end 62. The end portion 56 may be connected to an actuator that may rotate the camshaft 28 about the axis 50. For instance, the end portion 56 may be rotated by an actuator that may be coupled to the end portion 56 via a slack adjuster that may be provided to compensate for brake wear or wear of the friction material 42. The actuator may be of any suitable type, such as a pneumatic, hydraulic, electrical, or electromechanical actuator. In at least one embodiment, the end portion 56 may include a spline 90 that may be disposed on an exterior surface of the end portion 56. The spline 90 may mate with a corresponding spline that may be disposed in a hole of the slack adjuster to inhibit rotation of the slack adjuster with respect to the end portion 56.

The end portion 56 may include an end portion cavity 92 that may extend from the tube portion 52 at least partially toward an end of the end portion 56 to effectively extend the length or volume of the tube cavity 68 and further reduce weight of the camshaft 28. In FIG. 4, the end portion cavity 92 extends completely through the end portion 56 and may be fluidly connected to the tube cavity 68 in the tube portion 52. The end portion cavity 92 may extend along the axis 50 and may extend from a first end 94 of the end portion 56 to a second end 96 of the end portion 56 that may be disposed opposite the first end 94. Optionally, the end portion cavity 92 may have an enlarged portion 98 adjacent to the tube portion 52 that may have a similar configuration as the tube cavity 68 and may be larger than a remainder of the end portion cavity 92 as is best shown in FIG. 4. The end portion cavity 92 or enlarged portion 98 may receive a second tube end 62' having a male configuration as shown in FIG. 5. Alternatively, the end portion cavity 92 may be omitted or may not pass completely through the end portion 56 in one or more embodiments.

A lubricant fitting 100 may be disposed proximate the end portion 56. In at least one embodiment, the lubricant fitting 100 may be disposed proximate or may be received in the second end 96 of the end portion 56. The lubricant fitting 100, which may also be called a grease fitting, may help provide and contain lubricant within the camshaft 28. For instance, the lubricant fitting 100 may include a one-way orifice that may allow lubricant 102, such as grease or oil, to enter or pass through the lubricant fitting 100 to the tube cavity 68 via the end portion cavity 92 while inhibiting backflow or lubricant 102 from exiting the tube cavity 68 or end portion cavity 92 via the lubricant fitting 100. As such, the lubricant fitting 100 may be in fluid communication with the tube cavity 68 and end portion cavity 92. Lubricant 102 may also be stored in the cam cavity 82 and/or the end portion cavity 92 if provided.

The camshaft 28 may be manufactured in various ways. For example, the camshaft 28 may be made by providing a tube portion 52, a cam portion 54, and an end portion 56 and assembling these components together.

The tube portion 52 may be made in any suitable manner, such as with a deformation process like extrusion, drawing, roll forming, forging, molding, or the like. The outlet holes 70, if provided, may be provided either before or after making the tube portion 52.

After the tube portion 52 is fabricated, the cam portion 54 and end portion 56 may be fixedly attached to the first and second tube ends 60, 60', 60'', 62, 62', 62'', respectively. The cam portion 54 and end portion 56 may be attached simultaneously or at different times. In addition, the cam portion 54 and end portion 56 may be attached using any suitable technique, such as a thermal joining technique (e.g., friction welding, laser welding, brazing, etc.), deformation technique (e.g., swaging, shrink fitting, press fitting, upset forging, etc.) or chemical joining (e.g., adhesive bonding). The outlet holes 70 may facilitate assembly of the camshaft 28 in that they may allow hot gas to escape from the tube cavity 68 during thermal joining when an end portion cavity 92 is not provided or does not extend completely through the end portion 56.

The lubricant fitting 100, if provided, may be assembled to the end portion 56 either before or after the end portion 56 is assembled to the tube portion 52.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A brake camshaft comprising:
   a tube portion that extends along an axis and that has a first tube end, a second tube end, a tube cavity that extends from the first tube end to the second tube end, an inner surface that defines the tube cavity, an outer surface disposed opposite the inner surface, and at least one outlet hole that extends from the inner surface to the outer surface;
   a cam portion that is fixedly disposed on and engages the first tube end and is configured to actuate a brake pad assembly, wherein an end of the cam portion is completely received inside the tube cavity of the tube portion; and
   an end portion that is fixedly disposed on and engages the second tube end, wherein a first end of the end portion is completely received inside the tube cavity of the tube portion.

2. The brake camshaft of claim 1 wherein the inner and outer surfaces are radially disposed with respect to the axis.

3. The brake camshaft of claim 1 wherein the tube cavity receives a lubricant and the lubricant is provided to the outer surface via the outlet hole.

4. A brake camshaft comprising:
   a tube portion that extends along an axis and that has a first tube end, a second tube end disposed opposite the first tube end, and a tube cavity that extends from the first tube end to the second tube end;
   a cam portion that is fixedly disposed on and engages the first tube end and is configured to actuate a brake pad assembly, wherein the first tube end of the tube portion is completely received inside the cam portion; and
   an end portion that is fixedly disposed on and engages the second tube end, wherein the end portion has an end portion cavity that extends from a first end to a second end of the end portion and through the end portion to the tube cavity, wherein the second tube end is completely received inside an enlarged portion of the end portion cavity that extends from the first end and has a larger diameter than a remainder of the end portion cavity that extends from the enlarged portion to the second end of the end portion.

5. The brake camshaft of claim 4 wherein the end portion cavity extends along the axis.

6. The brake camshaft of claim 4 further comprising a lubricant fitting that is in fluid communication with the end portion cavity, wherein lubricant is provided to the tube cavity in the tube portion via the lubricant fitting and the end portion cavity.

7. The brake camshaft of claim 6 wherein the lubricant fitting is disposed proximate the second end.

8. The brake camshaft of claim 6 wherein the tube portion includes an outlet hole, wherein lubricant exits the tube cavity via the outlet hole.

9. A method of making a brake camshaft, comprising:
providing a tube portion that extends along an axis and that has a first tube end, a second tube end, a tube cavity that extends from the first tube end to the second tube end, an inner surface that defines the tube cavity, an outer surface disposed opposite the inner surface, and at least one outlet hole that extends from the surface to the outer surface;
fixedly coupling a cam portion that is configured to actuate a brake pad assembly to the first tube end such that an end of the cam portion is completely received inside the tube cavity and the cam portion engages the first tube end; and
fixedly coupling an end portion to the second tube end such that a first end of the end portion is completely received inside the tube cavity and the end portion engages the second tube end.

10. The method of claim 9 wherein the cam portion is welded to the first tube end.

11. The method of claim 9 wherein the end portion is welded to the second tube end.

12. The method of claim 9 wherein fixedly coupling the cam portion includes press fitting the cam portion and the tube portion.

13. The method of claim 9 wherein fixedly coupling the end portion includes press fitting the end portion and the tube portion.

14. The brake camshaft of claim 4 wherein the tube cavity receives lubricant and the lubricant is provided from the tube cavity to an outer surface of the tube portion via an outlet hole of the tube portion.

15. The brake camshaft of claim 1 wherein a lubricant fitting is disposed at a second end of the end portion that is disposed opposite the first end and provides lubricant to the tube cavity by way of an end portion cavity of the end portion, wherein the end portion cavity extends along the axis and a portion of the end portion cavity that extends from the second end has a smaller diameter than the tube cavity.

* * * * *